United States Patent
Saeedi

(10) Patent No.: US 11,445,214 B2
(45) Date of Patent: Sep. 13, 2022

(54) DETERMINING VARIANCE OF A BLOCK OF AN IMAGE BASED ON A MOTION VECTOR FOR THE BLOCK

(71) Applicant: ATI TECHNOLOGIES ULC, Markham (CA)

(72) Inventor: Mehdi Saeedi, Markham (CA)

(73) Assignee: ATI Technologies ULC, Markham (CA)

( * ) Notice: Subject to any disclaimer, the term of this patent is extended or adjusted under 35 U.S.C. 154(b) by 298 days.

(21) Appl. No.: 16/377,524

(22) Filed: Apr. 8, 2019

(65) Prior Publication Data

US 2019/0238884 A1   Aug. 1, 2019

Related U.S. Application Data

(63) Continuation of application No. 15/292,757, filed on Oct. 13, 2016, now Pat. No. 10,291,931.

(51) Int. Cl.
| | |
|---|---|
| *H04N 19/513* | (2014.01) |
| *H04N 19/567* | (2014.01) |
| *H04N 19/176* | (2014.01) |
| *H04N 19/182* | (2014.01) |

(52) U.S. Cl.
CPC ......... *H04N 19/521* (2014.11); *H04N 19/176* (2014.11); *H04N 19/182* (2014.11); *H04N 19/567* (2014.11)

(58) Field of Classification Search
CPC .. H04N 19/521; H04N 19/176; H04N 19/182; H04N 19/567
USPC .................................................. 375/240.16
See application file for complete search history.

(56) References Cited

U.S. PATENT DOCUMENTS

| | | |
|---|---|---|
| 6,529,634 B1 | 3/2003 | Thyagarajan et al. |
| 6,591,015 B1 | 7/2003 | Yasunari et al. |
| 8,411,750 B2 | 4/2013 | Dane |

(Continued)

FOREIGN PATENT DOCUMENTS

| | | |
|---|---|---|
| EP | 0 884 911 A1 | 12/1998 |
| JP | 10-191360 A2 | 7/1998 |
| JP | 2007-228519 A2 | 9/2007 |

OTHER PUBLICATIONS

Wikipedia, the Free Encyclopedia, "Variance", available at: https://en.wikipedia.org/wiki/Variance, 2016 (Retrieved Oct. 11, 2016).

(Continued)

*Primary Examiner* — Ayman A Abaza
(74) *Attorney, Agent, or Firm* — Volpe Koenig

(57) ABSTRACT

Techniques are provided for determining variance of a pixel block in a frame of video based on variance of pixel blocks in a reference frame of the video, instead of directly, for example, by calculating variance based on pixel values of the pixel block. The techniques include identifying a motion vector for a pixel block in a current frame, the motion vector pointing to a pixel block in a reference frame. The techniques also include determining the cost associated with the motion vector and comparing the cost to first and second thresholds. The techniques include determining the variance for the pixel block of the current frame based on the comparison of the cost to the first and second threshold and based on the variance of the pixel block of the reference frame.

23 Claims, 6 Drawing Sheets

(56) References Cited

U.S. PATENT DOCUMENTS

2005/0047504 A1* 3/2005 Sung .................... H04N 19/105
375/240.2
2011/0289128 A1* 11/2011 Star Sung ............. G06F 17/147
708/210

OTHER PUBLICATIONS

Wikipedia, the Free Encyclopedia, "Block-matching algorithm", available at: https://en.wikipedia.org/wiki/Block-matching_algorithm, 2016 (Retrieved Oct. 11, 2016).

Wikipedia, the Free Encyclopedia, "Mean squared error", available at: https://en.wikipedia.org/wiki/Mean_squared_error, 2016 (Retrieved Oct. 11, 2016).

Wikipedia, the Free Encyclopedia, "Image stabilization", available at: https://en.wikipedia.org/wiki/Image_stabilization, 2016 (Retrieved Oct. 11, 2016).

Wikipedia, the Free Encyclopedia, "Video scaler", available at: https://en.wikipedia.org/wiki/Video_scaler, 2016 (Retrieved Oct. 11, 2016).

Wikipedia, the Free Encyclopedia, "Seam carving", available at: https://en.wikipedia.org/wiki/Seam_carving, 2016 (Retrieved Oct. 11, 2016).

Wikipedia, the Free Encyclopedia, "Lossy compression", available at: https://en.wikipedia.org/wiki/Lossy_compression, 2016 (Retrieved Oct. 11, 2016).

Wikipedia, the Free Encyclopedia, "Machine learning", available at: https://en.wikipedia.org/wiki/Machine_learning, 2016 (Retrieved Oct. 11, 2016).

Wikipedia, the Free Encyclopedia, "Regression analysis", available at: https://en.wikipedia.org/wiki/Regression_analysis, 2016 (Retrieved Oct. 11, 2016).

Kuo, C., et. al., "Fast motion search with efficient inter-prediction mode decision for H.264", Journal of Visual Communication and Image Representation; Academic Press, Inc., US, vol. 17, No. 2, Apr. 1, 2006, pp. 217-242 (XP005312622).

Bakar, S. A. R. A. & Green, R. J., "Adaptive Thresholding in Dynamic Scene Analysis for Extraction of Fine Line", Tencon 200 Proceedings, IEEE Region 10 Annual Conference, Kuala Lumpur, Sep. 24, 2000, pp. 141-143 (XP000987965).

Puri, A., et. al., "Video coding using the H.264/MPEG-4 AVC compression standard"; Signal Processing, Image Communication, Elsevier Science Publishers, Amsterdam, NL, vol. 19, No. 9, Oct. 1, 2004, pp. 793-849 (XP004607150).

\* cited by examiner

DETERMINING VARIANCE OF A BLOCK OF AN IMAGE BASED ON A MOTION VECTOR FOR THE BLOCK

CROSS REFERENCE TO RELATED APPLICATIONS

This application is a continuation of U.S. patent application Ser. No. 15/292,757, filed on Oct. 13, 2016 which is incorporated by reference herein in its entirety.

BACKGROUND

A variance map—a map of variances determined for pixel blocks of an image—has many uses in image and video processing. Such uses include, for example, image or video resizing, compression, and the like. However, determining variance is typically a computationally intensive operation. This fact means that analysis requiring determining of variance is typically relatively slow.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for determining variance of a pixel block in a frame of video based on variance of pixel blocks in a reference frame of the video, instead of directly, for example, by calculating variance based on pixel values of the pixel block. The techniques include identifying a motion vector for a pixel block in a current frame, the motion vector pointing to a pixel block in a reference frame. In one example, the motion vector is identified from previously used image processing data that already includes the motion vector, which was determined for a purpose other than determining variance (such as for image compression, video processor, or the like. In another example, the motion vector is identified directly through techniques described herein. The techniques also include determining the cost associated with the motion vector and comparing the cost to first and second thresholds. If the cost is below the first threshold, then the pixel block in the current frame is considered to be sufficiently similar to the pixel block in the reference frame pointed to by the motion vector and the variance of the pixel block of the reference frame (which was already determined) is used as the variance for the pixel block in the current frame.

If the cost is between the first and second thresholds, then the variance of the pixel block of the reference frame, modified by a correlation function, is used as the variance for the pixel block of the current frame. If the cost of the pixel block of the current frame is above the second threshold, then using the variance of the pixel block of the reference frame is deemed to be unreliable (the "estimated variance" is deemed to be unreliable) and the variance of the pixel block of the current frame is determined directly (e.g., through an expression for calculating variance, provided herein). The techniques described above are used for all pixel blocks of the current frame. If the number of pixel blocks of the current frame that have an unreliable estimated variance is above a third threshold, then the variance estimation technique is considered to be too unreliable (e.g., because a scene change has occurred in the video) and the variance for each pixel block of the current frame is instead determined directly from the pixel values of the pixels in each block of the current frame.

Figure 1:
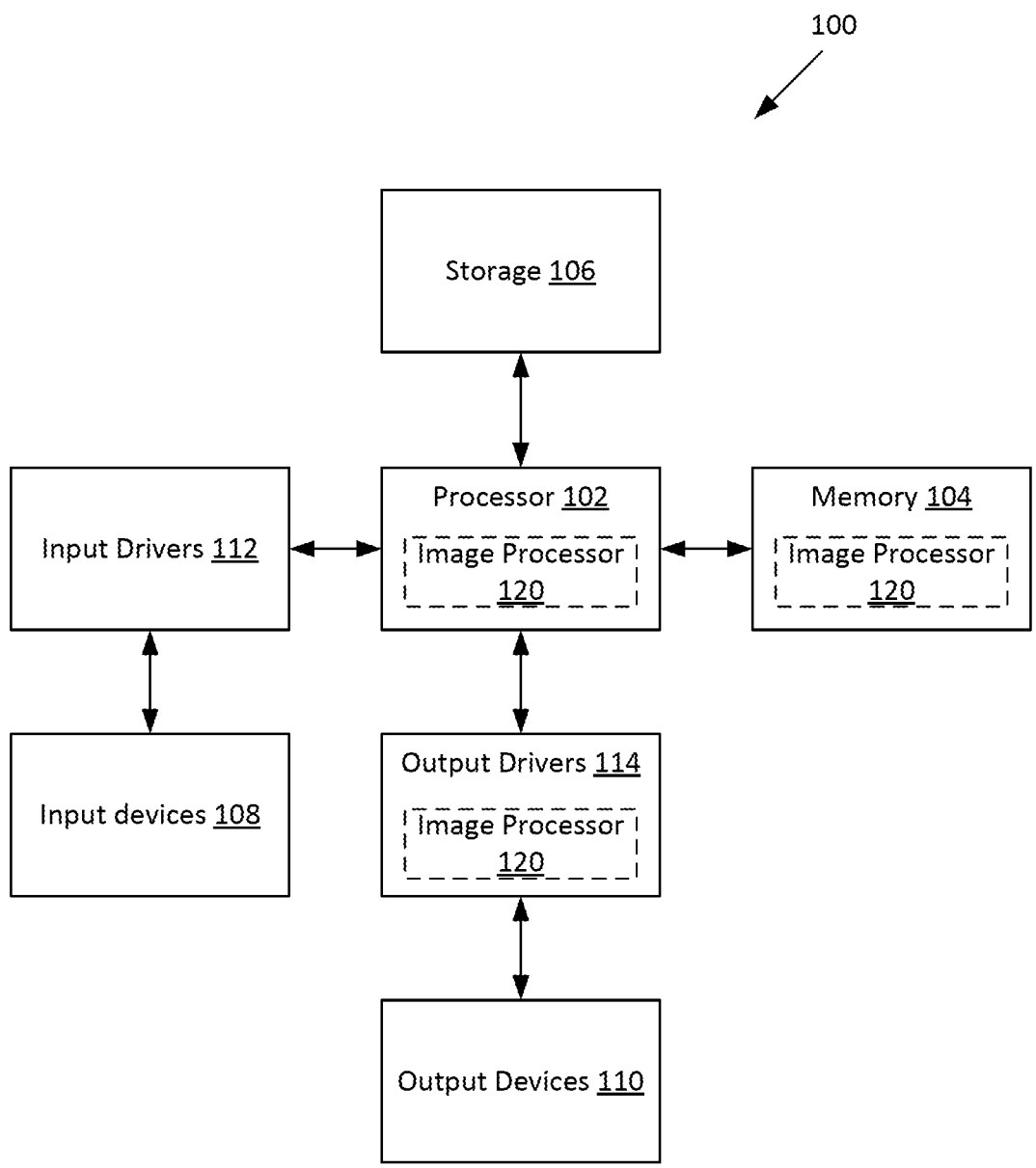
FIG. 1 is a block diagram of an example device in which aspects of the present disclosure are implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 optionally includes an input driver 112 and an output driver 114. It is understood that the device 100 optionally includes additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

The network interface card ("NIC") 118 provides an interface to other devices via a computer network. The NIC 118 is configured to communicate with an external device via a networking protocol such as ethernet, wi-fi, InfiniBand, or other protocols. The accelerators 116 include one or more devices that are configured to accept and execute processing tasks. These devices include one or more of a graphics processing unit ("GPU"), field programmable gate array ("FPGA"), processing-in-memory chip ("PIM"), application-specific integrated circuit ("ASIC"), or other device.

An image processor 120 is shown in two different forms. In a first form, the image processor 120 is software that is stored in the memory 104 and that executes on the processor 102 as shown. In a second form, the image processor is at least a portion of a hardware graphics engine that resides in output drivers 114. In other forms, the image processor 120 is a combination of software and hardware elements, with the hardware residing, for example, in output drivers 114, and the software executed on, for example, the processor 102.

The image processor 120 accepts input images for analysis, analyzes the images, and produces analysis results that may include output images. On task that the image processor 120 performs is determining variance values for each of a series of blocks in an input image. Conceptually, variance indicates how similar pixels of a block are to each other. A solid color block of pixels would have a very low variance and a mosaic of different pixel colors would have a very high variance. The variances values can be used in a number of different image processing techniques performed by the image processor 120 or by another part of the device 100. Thus, the image processor 120 may use the variance to perform one or more image processing techniques.

Figure 2:
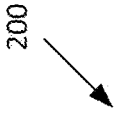
FIG. 2 is a diagram that illustrates an image, according to an example.

FIG. 2 is a diagram that illustrates an image 200, according to an example. The image 200 is an image data for analysis and/or display on a screen (e.g., that may be included in the output devices 110 ). The image 200 is an image for processing by the image processor 120 in order to determine variance of the image 200. The image 200 illustrated in FIG. 2 includes a series of pixel blocks 202 arranged in a grid as shown. Each pixel block 202 is the same size and includes the same number of pixels. The techniques for determining variance described herein determine variance values for each of the blocks 202 in an image such as the image 200 of FIG. 2.

Figure 3:
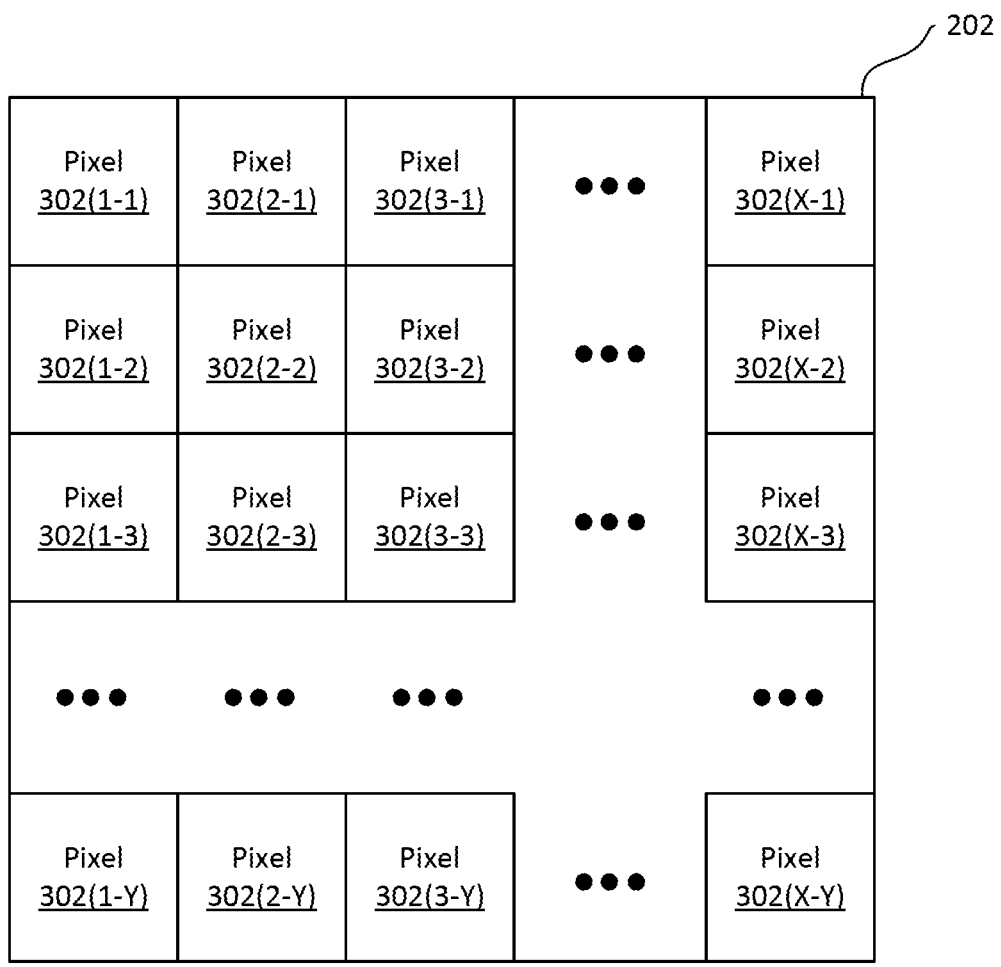
FIG. 3 is a diagram that illustrates pixels within a block, according to an example.

FIG. 3 is a diagram that illustrates pixels 302 within a block 202, according to an example. The block 202 illustrated in FIG. 3 has a width of X pixels and a height of Y pixels and thus has N=X×Y pixels. In one example, variance for the block 202 is determined as follows:

$$\text{Var(Block)} = \frac{\sum_{i=1}^{N}(pixel_i - \mu)^2}{N - 1}$$

In the above expression, the term "μ" is the arithmetic mean of all of the pixels in the block. The term "$pixel_i$" is a representative color value or a brightness value for each pixel. For example, if the pixel is represented in YUV color space, then the pixel value used is the Y (brightness) value. If the pixel is represented in RGB color space, then any of the R, G, or B components could be used as "$pixel_i$." Thus, the variance of the block is equal to the sum of the difference of each pixel from the mean pixel value, squared, and divided by the number of pixels (N) minus 1. Determining the variance directly is mathematically intensive, as doing so involves square root operations and a division operation. Thus, techniques for determining variance for one or more blocks 202 of a frame that do not require direct calculation of the variance are provided herein. Specifically, these techniques use a motion vector technique to estimate variance for blocks 202 in a particular frame based on the variance of blocks in a "reference frame," where the reference frame can be any other frame, such as the immediately preceding frame.

Figure 4:
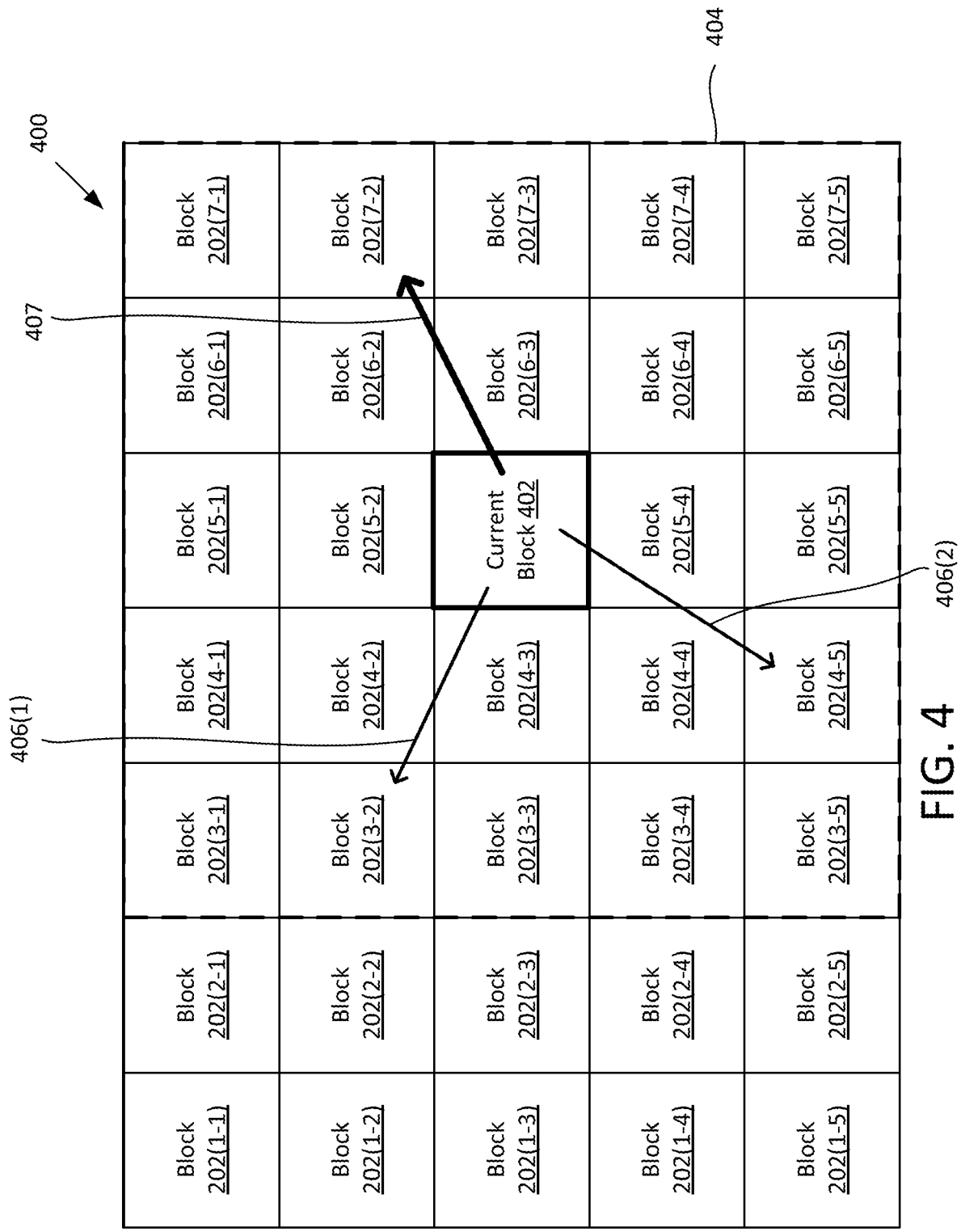
FIG. 4 illustrates a motion vector technique applied to images of a video, for determining variance for one or more blocks of a current frame of the image, according to an example.

FIG. 4 illustrates a motion vector technique applied to images of a video, for determining variance for one or more blocks 202 of a current frame of the image, according to an example. In one example, the image processor 120 uses this motion vector technique to determine motion vectors for determining variance. Alternatively, the image processor 120 obtains motion vectors already determined for a different purpose, such as for image compression, video analysis, or the like.

The motion vector technique involves determining a "motion vector" 407 for each block 202 in a current frame (i.e., a frame under analysis). The motion vector 407 represents the "distance" that a particular block 202 of pixels moved between two frames of a video. More specifically, a motion vector 407 indicates the block in a reference frame from which the pixels of the block in the current frame moved. The reference frame is a frame other than the current frame and can be, for example, the immediately prior frame or some other frame before the current frame. In some examples, a future frame is a reference frame.

In one example, a block includes pixels that show an edge between a sky and a lawn. In a previous frame (a "reference frame"), the pixels of that edge were in a block having coordinates 7, 9. In the current frame, the pixels of that edge are in a block having coordinates 8, 10. The motion vector for the block having coordinates 8, 10 in the current frame is −1, −1, which points to the block having coordinates 7, 9, from the block having coordinates 8, 10. Although the motion vector technique is typically used for purposes not directly related to determination of the variance of a block, a novel technique for using motion vectors 407 to determine variance of a block is proposed herein.

In FIG. 4, an overlay 400 of a current frame and a reference frame is shown. The overlay 400 is an overlay in the sense that blocks from two frames are shown in the overlay 400. These two frames are a current frame and a reference frame. The only block for the current frame is the current block 402. All other blocks 202 are blocks from a reference frame.

Determination of a motion vector 407 for the current block 402 involves determining a cost for each of a plurality of candidate motion vectors 406. Once a cost for each candidate motion vector 406 has been determined, determining the motion vector 407 for the current block 402 involves identifying the lowest cost out of all determined costs. The candidate motion vector 406 with the lowest cost, out of all candidate motion vectors 406 examined, is considered to be the motion vector for the current block 402. In other words, that candidate motion vector 406 is said to represent the distance which the pixels of the current block 402 moved between the reference frame and the current frame. The cost associated with that motion vector is considered to be the cost for the current block 402. Motion vectors, such as the candidate motion vectors 406, are defined in units of blocks 202 (rather than in units of pixels 302 ). Thus, a motion vector denoted as (1,1) refers to the block 202 that is one block 202 to the right and one block 202 above the current block 402. (The correlation of sign, such as positive or negative, with directionality, such as up, or down, is arbitrary and any correlation can be used).

Several candidate motion vectors 406 are illustrated within a search area 404 in FIG. 4. The search area 404 is a portion of the image in which the image processor 120 searches for the candidate motion vector 406 with the lowest cost. "Cost" can be thought of as a measure of "similarity" between the current block 402 and the block 202 pointed to by a particular candidate motion vector 406. The image processor 120 determines a cost for each of the candidate motion vectors 406 that points to each different block 202 within the search area 404 and identifies the candidate motion vector 406 with the lowest cost. In one example, the search area 404 is defined by a vertical block range and a horizontal block range. In this example, the search area 404 is defined as including all blocks 202 within a horizontal distance equal to the horizontal block from of the current block 402 and within a vertical distance equal to the vertical block range from the current block 402.

Note that although only two candidate motion vectors 406 are shown in FIG. 4, this is for clarity only. In operation, the image processor 120 would identify candidate motion vectors 406 for all blocks 202 within the search area 404 and the reference frame, would identify costs for each such candidate motion vector 406, and would identify the motion vector 407 for the current block 402 by finding the block 202 in the reference frame that has the lowest cost. The candidate motion vector 406 that points to that block 202 would be the motion vector 407 for the current block 402. Further, the cost (the "lowest cost" out of all costs analyzed) would become the cost assigned to the current block 402. This cost for the current block 402 would indicate how similar the pixels of the current block 402 are to the pixels of the most similar block 202 of the reference frame within the search area 404. Note also that a candidate motion vector 406 pointing to a block in the same position as the current block 402 but in the reference frame is also searched in determining the motion vector 407 for the current block 402. Such a candidate motion vector 406 would be associated with no motion of the pixels of the current block 402 between the reference frame and the current frame.

There are many techniques that can be used for determining cost of a block 202. One example is the mean absolute difference technique. With the mean absolute difference technique, cost is determined according to the following expression:

$$\frac{1}{N^2} \sum_{i=0}^{n-1} \sum_{j=0}^{n-1} |C_{ij} - R_{ij}|$$

where $C_{ij}$ is a pixel in the current block 402 at location i, j in that block and $R_{ij}$ is the corresponding pixel in the block 202 for which the cost is being determined.

Another example is the mean squared error. With the mean squared error technique, cost is determined according to the following expression:

$$\frac{1}{N^2} \sum_{i=0}^{n-1} \sum_{j=0}^{n-1} (C_{ij} - R_{ij})^2$$

where, as with the mean absolute difference technique, $C_{ij}$ is a pixel in the current block 402 at location i, j in that block and $R_{ij}$ is the corresponding pixel in the block 202 for which the cost is being determined. As with the "$pixel_i$" term for direct variance determination, the $C_{ij}$ or $R_{ij}$ values can be a brightness value if the pixel is represented in the YUV color space or can be any of the red, green, or blue components if the pixel is represented in the RGB color space. Any other technically feasible technique for determining cost of a block 202 may alternatively be used.

After determining a motion vector 407 and a cost for the current block 402, the image processor 120 processes these items to obtain a variance for the current block 402. More specifically, the image processor 120 analyzes the cost to determine which one of three operations are used to obtain the variance for the current block 402. The first operation occurs when the cost is below a first threshold. The first operation is to use the variance of the block 202 pointed to by the motion vector 407 for the current block 402 as the variance for the current block 402. Conceptually, this can be thought in the following manner. If the cost of the current block 402 is sufficiently low, then the block 202 pointed to by the motion vector 407 is considered to be very similar to the current block 402. Thus, the variance of the current block 402 can be assumed to be the same as the variance of the block 202 pointed to by the motion vector 407. One situation for when this occurs is when there is no motion in the image at all. In such a situation, the current block 402 is the same as the block 202 pointed to by the motion vector and the cost is zero or close to zero.

The second operation to determine the variance based on the cost of the current block 402 occurs when the cost is above the first threshold but below a second threshold. In this instance, the image processor 120 determines the variance as a multiple of the variance of the block 202 pointed to by the motion vector 407. The multiple ranges from 0 to 1. In some examples, the multiple varies with the cost as determined by a correlation function. Techniques for determining a correlation function are described below.

The third operation to determine the variance based on the cost of the current block 402 occurs when the cost is above the second threshold. In this instance, the current block 402 and the block 202 pointed to by the motion vector 407 are considered to be too dissimilar and the current block 402 is deemed to have an "unreliable predicted variance." In this instance, the image processor 120 determines the variance of the current block 402 directly from the value of the pixels in the current block 402, rather than based on another block 202 in the reference image. In one example, the image processor 202 determines the variance directly using the expression provided with respect to FIG. 3:

$$\text{Var(Block)} = \frac{\sum_{i=1}^{N} (pixel_i - \mu)^2}{N - 1}$$

The image processor 120 determines a motion vector 407 and cost for each of the blocks in the current frame using the motion vector techniques described above. In the event that the number of blocks in the current frame that have unreliable predicted variance is above a third threshold, the image processor 120 determines that a scene change has occurred (in other words, if too many blocks in the current frame are very dissimilar to any other block 202 in the reference frame, then the image processor 120 determines that a scene change has occurred). In the event that a scene change has occurred, the image processor 120 directly calculates variance for all blocks of the current frame, instead of basing variance for any of the blocks of the current frame on variance of blocks 202 in a reference frame. The reason that the image processor 120 directly calculates variance for all blocks of the current frame is to avoid propagation of errors in variance across a scene change boundary.

In some examples, the correlation function, the first threshold, the second threshold, and the third threshold is hard-coded as calibration data into the image processor 120. In another example, any or all of the calibration data is determined by a calibration system in a calibration procedure. In one example, a calibration system determines the calibration data via machine learning techniques. In one example, the calibration system is software executing on a standard computer, such as a computer including a processor and memory storing instructions for execution by the processor, the instructions causing the processor to perform the operations of the calibration system. In another example, the calibration system is embodied as an application specific integrated circuit or can be any other technically feasible system for performing the operations described herein.

Figure 5:
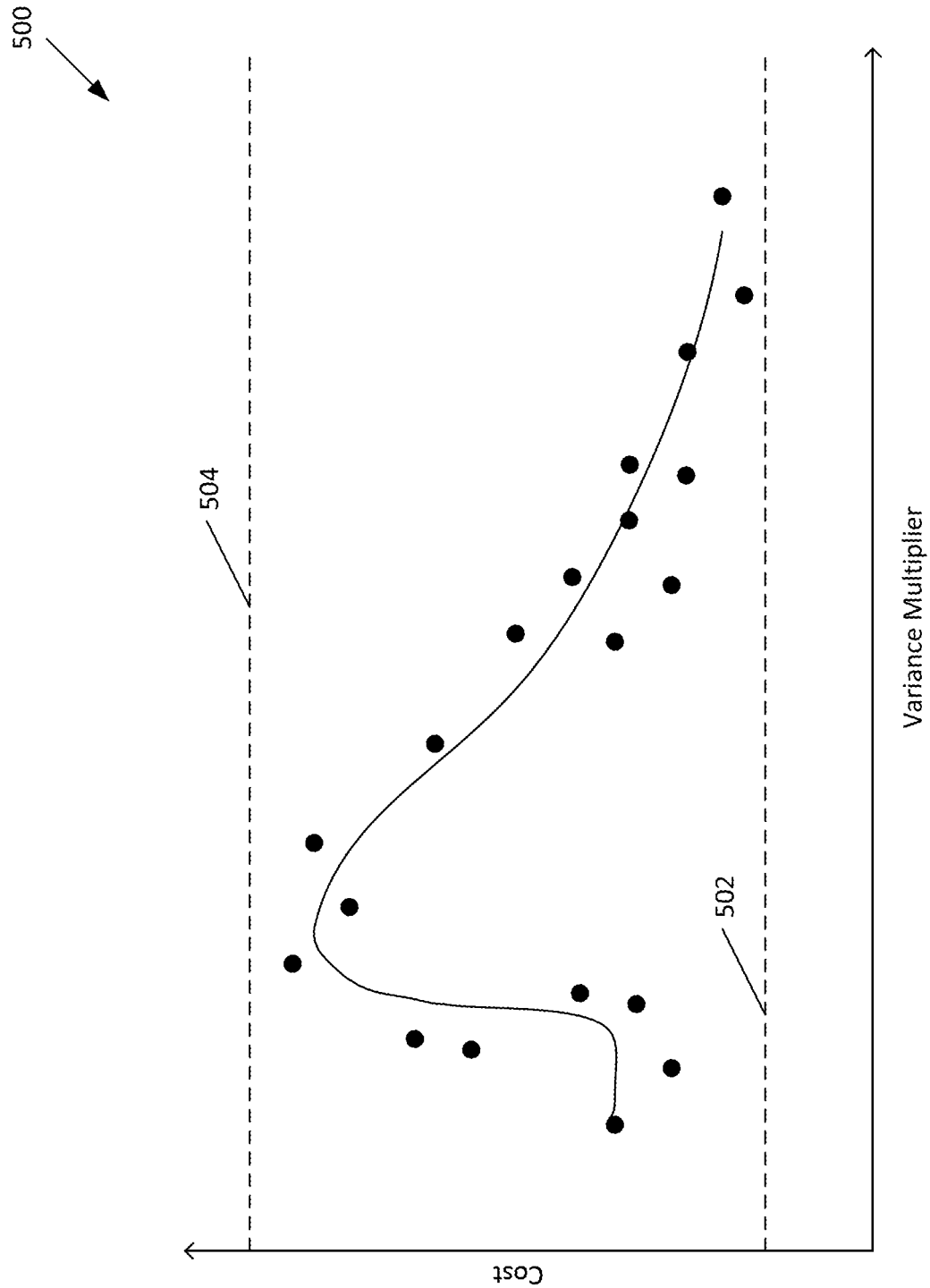
FIG. 5 is a graph that illustrates an example of regression analysis.

One example of a machine learning technique is regression analysis. FIG. 5 is a graph 500 that illustrates an example of regression analysis. To apply regression analysis to find the correlation function of the calibration data, the calibration system accepts as input data one or more training videos. The calibration system directly determines the variance for all blocks in each of the frames of each of the training videos (e.g., according to the expression described with respect to FIG. 3). The calibration system also determines which reference frame should be used for each frame of each video (in one example, the reference frame for any frame is the immediately previous frame). The calibration system determines cost for each of the blocks of each of the frames. As described above, cost for any particular block of any particular frame is associated with a reference frame. The calibration system then generates set of "variance multipliers" for each block and plots the variance multipliers against the costs. The variance multiplier, plotted on the x-axis, is the multiplicative relationship between the actual variance of a block in a frame and the actual variance of a corresponding block in the reference frame for which the cost is calculated. The graph 500 is an example plot of variance multiplier versus cost, where each data point corresponds to a single block and is defined by variance multiple and cost for a single block.

After this data is plotted, the calibration system fits a curve to the plotted data. The curve that results acts as the correlation function. In other words, the curve that is fit to the data is used by the image processor 120 as the correlation function. Any technically feasible technique for fitting a curve to plotted data may be used (for example, any non-linear regression technique for fitting a curve to data). Any other technically feasible machine learning technique for correlating the variance multiplier to the cost may be used.

The first threshold 502 is the threshold under which the variance multiplier is set to equal 1, as described above. The second threshold 504 is the threshold above which the image processor 120 determines that a predicted variance would be an unreliable predicted variance. (These thresholds are the first and second thresholds described above). Each of these thresholds can be set to limit the amount of error in operation of the image processor 120. More specifically, after the correlation function is determined, the calibration system sets the first threshold 502 and second threshold 504 to arbitrary values, applies the variance calculation techniques described above to test data to obtain predicted variance values, and determines the error between the predicted variance values and actual variance values (determined, e.g., through direct computation as with the expression described with respect to FIG. 3). If this error is above an error rate deemed to be undesirable, then the calibration system sets the first threshold 502 lower or sets the second threshold 504 higher, or both sets the first threshold 502 lower and sets the second threshold 504 higher. The calibration system repeats this process until the error is at or below a desired rate. Similarly, in some examples, the third threshold is determined by applying the variance calculation techniques provided above to one or more videos, detecting the error rate, and modifying the third threshold until a satisfactory error rate is achieved.

In some examples, the image processor 120 stores multiple sets of calibration data, where each set is stored for a different "type" of video, where "type" refers to the type of content of the video. Some example video types include nature videos, action movies, news videos, talk show videos, and the like. In some examples, each video is tagged with a type identifier, which allows the image processor 120 to determine which set of calibration data to use.

In some examples, no correlation function is used. Instead, the variance of the block 202 pointed to by the motion vector is either used or not used based on the cost of the current block 402. Put differently, the first threshold is equal to the second threshold so that the range of cost values over which the correlation function is used is collapsed and does not exist. Either the cost is under the first threshold and the second threshold, in which case the variance of the block 202 pointed to by the motion vector is used or the cost is over the first threshold and the second threshold, in which case the image processor 120 determines the variance of the current block 402 directly.

Figure 6:
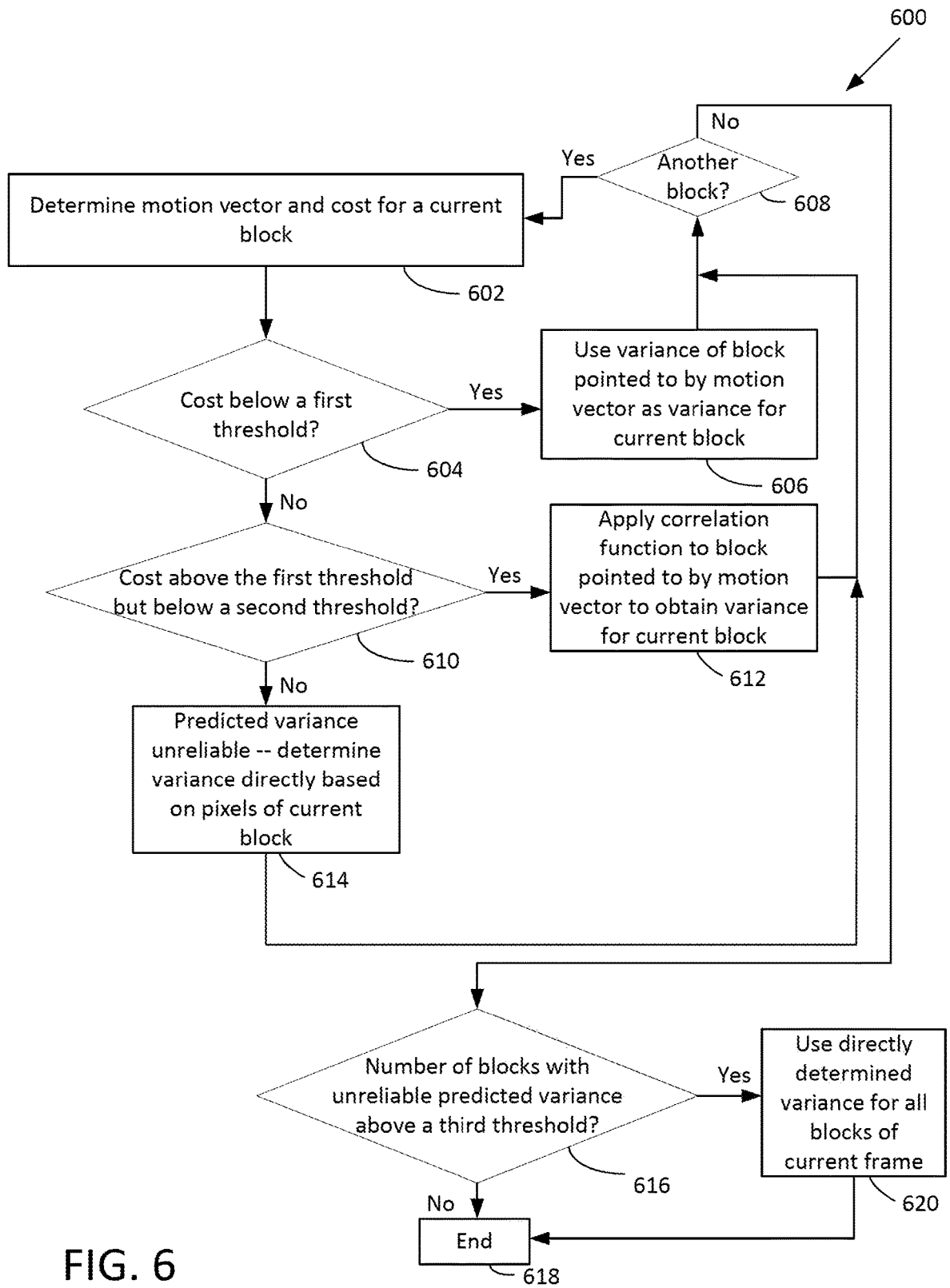
FIG. 6 is a flow diagram of a method for determining variance values based on "cost" (similarity to blocks of a reference frame), according to an example.

FIG. 6 is a flow diagram of a method 600 for determining variance values based on "cost" (similarity to blocks of a reference frame), according to an example. Although described with respect to the system shown and described with respect to FIGS. 1-5, it should be understood that any system configured to perform the method, in any technically feasible order, falls within the scope of the present disclosure.

The method 600 begins at step 602, where the image processor 120 determines a motion vector and cost for a current block. In one example, the image processor 120 directly determines the motion vector, such as by using the above motion vector technique described above. More specifically, the image processor 120 directly determines the motion vector and cost for the current block by identifying a search area, identifying all blocks in a reference frame within the search area, determining costs for all blocks in the reference frame within the search area, and identifying the lowest determined cost. The lowest determined cost is the cost for the current block and the motion vector associated with the lowest determined cost is the motion vector for the current block. In another example of determining the motion vector, the image processor 120 obtains motion vectors already determined for a different purpose, such as for image compression, video analysis, or the like.

At step 604, the image processor 120 determines whether the cost for the block is below a first threshold. The first threshold represents a level below which it is determined that the block associated with the motion vector is sufficiently similar to the current block that the variance for that block can be used as the variance for the current block. Thus if the cost is below the first threshold, the method 600 proceeds to step 606, where the image processor 120 uses the variance of the block associated with the determined motion vector as the variance for the current block. After step 606, the method 600 proceeds to step 608.

If, at step 604, the image processor 120 determines that the cost is above the first threshold, then the method 600 proceeds to step 610. At step 610, the image processor 120 determines whether the cost is above the first threshold but below the second threshold. The second threshold is a level above which the predicted variance is deemed to be unreliable (because the cost is too high, meaning that the block associated with the cost is too dissimilar to the current block). If the cost is above the first threshold but below the second threshold, then the method 600 proceeds to step 612, where the image processor 120 applies the correlation function described above to the variance of the block pointed to by the motion vector to obtain the variance for the current block. After step 612, the method 600 proceeds to step 608.

If, at step 610, the image processor 120 does not determine that the cost is above the first threshold but below the second threshold, then the cost is above the second threshold and the method proceeds to step 614. At step 614, the image processor 120 determines that the predicted variance for the current block is unreliable and the image processor 120 determines the variance for the current block directly, such as via the expression provided above with respect to FIG. 3. After step 614, the method proceeds to step 608.

At step 608, the image processor 120 determines whether there is another block to analyze in the current frame. If there is another block, then the method 600 returns to step 602 and if there is not another block, then the method 600 proceeds to step 616. At step 616, all blocks of the current frame have been analyzed and the method 600 determines whether the number of blocks with an unreliable predicted variance is above a third threshold. If the number of blocks with unreliable predicted variance is above the third threshold, then the method 600 proceeds to step 620 and if the number of blocks with unreliable predicted variance is below the third threshold, then the method 600 proceeds to step 618, where the method 600 ends. At step 620, the image processor 120 uses a directly determined variance for all blocks of the current frame, instead of variances determined either at step 606 or at step 612. After step 620, the method proceeds to step 618.

There are many possible uses for variance determined for blocks. One example is video stabilization. The purpose of video stabilization is to remove unwanted camera motion in the video. A video stabilizer (which, in an example, is part of the image processor 120) identifies the manner in which unwanted motion in a video occurs by identifying motion vectors for blocks 202 in the video. More specifically, for any frame for which video stabilization is to be performed, the image processor 120 determines motion vectors for various blocks in the frame. The motion vectors indicate an estimated motion of the camera relative to the reference frame. The image processor 120 is then able to correct the current frame by modifying the current frame based on the estimated motion of the camera relative to the reference frame. In determining the estimated motion of the camera, the image processor 120 uses certain motion vectors, but avoids other motion vectors. More specifically, blocks 202 that have low variance are subject to inaccurate motion vectors because the change in such blocks is typically dominated by noise. For this reason, the image processor 120 uses determined variance for the blocks 202 to determine which motion vectors to disregard. The image processor 120 ignores motion vectors for blocks 202 with variance below a particular threshold that can be set in any technically feasible manner (e.g., manually).

Another example is video or image resizing. One technique for image resizing is seam carving. (See, e.g., "Seam Carving for Content-Aware Image Resizing"). Seam carving removes portions of an image deemed to be unimportant. In some examples, blocks are determined to be unimportant based on the variance of the blocks. Blocks having low variance are deemed to be unimportant. Yet another example of a way in which variance can be used is lossy video compression. In lossy video compression, blocks that have a low variance can be compressed to a greater degree or in a lossy manner, where blocks that have a higher variance are compressed to a lesser degree or in a non-lossy manner.

Some or all of the operations described herein for determining variance for blocks of an image, as well as some or all of the operations described for ways in which the variance can be used, are performed by the image processor 120.

The techniques described herein provide an advantageous technique for determining variance for frames of a video. More specifically, the techniques determine variances based on motion vectors, either using the variance of the block in a reference frame pointed to by the motion vector or using a modified version of that variance. Using already-existing variances reduces the amount of calculation required to determine variance, which reduces the time required to determine variance.

An example method for determining a variance for a pixel block is provided. The method includes identifying a motion vector for the pixel block, the motion vector being associated with a second pixel block of a reference frame. The method also includes determining a cost for the pixel block, the cost indicating a degree of similarity between the pixel block and the second pixel block. The method further includes determining the variance for the pixel block based on the cost.

In one example, determining the variance for the pixel block based on the cost comprises determining that the cost is below a first threshold and responsive to determining that the cost is below the first threshold, determining the variance for the pixel block as being equal to a variance of the second pixel block of the reference frame. In one example, determining the variance for the pixel block based on the cost comprises determining that the cost is above a first threshold but below a second threshold and responsive to determining that the cost is above the first threshold but below the second threshold, determining the variance for the pixel block as being equal to a variance of the second pixel block of the reference frame multiplied by a correlation factor.

In one example, the correlation factor is based on a correlation function that is based on video training data. In one example, determining the variance for the pixel block based on the cost comprises determining that the cost is above a first threshold and a second threshold, and responsive to determining that the cost is above both the first threshold and the second threshold, determining the variance for the pixel block directly based on the pixels of the pixel block.

In one example, determining the variance comprises determining that costs for a threshold number of blocks in a current frame in which the pixel block exists are all above both a first threshold and second threshold and responsive to determining that the costs for the threshold number of blocks are above the first threshold and the second threshold, directly determining the variance for all pixel blocks of the current frame based on pixel values of each respective pixel block.

In one example, identifying the motion vector for the pixel block comprises identifying a set of candidate motion vectors that point to pixel blocks of the reference frame within a search area, determining costs for each of the pixel blocks of the reference frame within the search area, identifying the lowest cost of the determined costs, and identifying, as the motion vector for the pixel block, the candidate motion vector associated with the lowest cost of the determined costs. In one example, determining the costs for each of the pixel blocks comprises applying a mean absolute difference technique or a mean squared error technique on pixels of the pixel blocks. In one example, the reference frame comprises a frame prior to or after a current frame in which the pixel block exists.

An example computer system for determining a variance for a pixel block is provided. The computer system includes a processor and a memory storing instructions that, when executed by the processor, cause the processor to perform steps. The steps include identifying a motion vector for the pixel block, the motion vector being associated with a second pixel block of a reference frame. The steps also include determining a cost for the pixel block, the cost indicating a degree of similarity between the pixel block and the second pixel block. The steps also include determining the variance for the pixel block based on the cost.

In one example, determining the variance for the pixel block based on the cost comprises determining that the cost is below a first threshold and responsive to determining that the cost is below the first threshold, determining the variance for the pixel block as being equal to a variance of the second pixel block of the reference frame. In one example, determining the variance for the pixel block based on the cost comprises determining that the cost is above a first threshold but below a second threshold and responsive to determining that the cost is above the first threshold but below the second threshold, determining the variance for the pixel block as being equal to a variance of the second pixel block of the reference frame multiplied by a correlation factor.

In one example, the correlation factor is based on a correlation function that is based on video training data. In one example, determining the variance for the pixel block based on the cost comprises determining that the cost is above a first threshold and a second threshold, and responsive to determining that the cost is above both the first threshold and the second threshold, determining the variance for the pixel block directly based on the pixels of the pixel block.

In one example, determining the variance comprises determining that costs for a threshold number of blocks in a current frame in which the pixel block exists are all above both a first threshold and second threshold and responsive to determining that the costs for the threshold number of blocks are above the first threshold and the second threshold, directly determining the variance for all pixel blocks of the current frame based on pixel values of each respective pixel block.

In one example, identifying the motion vector for the pixel block comprises identifying a set of candidate motion vectors that point to pixel blocks of the reference frame within a search area, determining costs for each of the pixel blocks of the reference frame within the search area, identifying the lowest cost of the determined costs, and identifying, as the motion vector for the pixel block, the candidate motion vector associated with the lowest cost of the determined costs. In one example, determining the costs for each of the pixel blocks comprises applying a mean absolute difference technique or a mean squared error technique on pixels of the pixel blocks. In one example, the reference frame comprises a frame prior to or after a current frame in which the pixel block exists.

An example non-transitory computer-readable medium storing instructions that, when executed by a processor, cause the processor to execute a method for determining a variance for a pixel block is provided. The method includes identifying a motion vector for the pixel block, the motion vector being associated with a second pixel block of a reference frame. The method also includes determining a cost for the pixel block, the cost indicating a degree of similarity between the pixel block and the second pixel block. The method further includes determining the variance for the pixel block based on the cost.

In one example, determining the variance for the pixel block based on the cost comprises determining that the cost is below a first threshold and responsive to determining that the cost is below the first threshold, determining the variance for the pixel block as being equal to a variance of the second pixel block of the reference frame. In one example, determining the variance for the pixel block based on the cost comprises determining that the cost is above a first threshold but below a second threshold and responsive to determining that the cost is above the first threshold but below the second threshold, determining the variance for the pixel block as being equal to a variance of the second pixel block of the reference frame multiplied by a correlation factor.

In one example, the correlation factor is based on a correlation function that is based on video training data. In one example, determining the variance for the pixel block based on the cost comprises determining that the cost is above a first threshold and a second threshold, and responsive to determining that the cost is above both the first threshold and the second threshold, determining the variance for the pixel block directly based on the pixels of the pixel block.

In one example, determining the variance comprises determining that costs for a threshold number of blocks in a current frame in which the pixel block exists are all above both a first threshold and second threshold and responsive to determining that the costs for the threshold number of blocks are above the first threshold and the second threshold, directly determining the variance for all pixel blocks of the current frame based on pixel values of each respective pixel block.

In one example, identifying the motion vector for the pixel block comprises identifying a set of candidate motion vectors that point to pixel blocks of the reference frame within a search area, determining costs for each of the pixel blocks of the reference frame within the search area, identifying the lowest cost of the determined costs, and identifying, as the motion vector for the pixel block, the candidate motion vector associated with the lowest cost of the determined costs. In one example, determining the costs for each of the pixel blocks comprises applying a mean absolute difference technique or a mean squared error technique on pixels of the pixel blocks. In one example, the reference frame comprises a frame prior to or after a current frame in which the pixel block exists.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

The invention claimed is:

1. A method for determining a variance for a pixel block, the method comprising:
   identifying a motion vector for the pixel block, the motion vector being associated with a second pixel block of a reference frame;
   determining a cost for the pixel block, the cost indicating a degree of similarity between the pixel block and the second pixel block; and
   determining the variance for the pixel block based on the cost.

2. The method of claim 1, wherein determining the variance for the pixel block based on the cost comprises:
   determining that the cost is below a first threshold; and
   responsive to determining that the cost is below the first threshold, determining the variance for the pixel block as a variance of the second pixel block of the reference frame.

3. The method of claim 1, wherein determining the variance for the pixel block based on the cost comprises:
   determining that the cost is above a first threshold but below a second threshold; and
   responsive to determining that the cost is above the first threshold but below the second threshold, determining the variance for the pixel block as a variance of the second pixel block of the reference frame modified by a correlation factor.

4. The method of claim 3, wherein:
   the correlation factor is based on a correlation function that is based on video training data.

5. The method of claim 1, wherein determining the variance for the pixel block based on the cost comprises:
   determining that the cost is above a first threshold and a second threshold; and
   responsive to determining that the cost is above both the first threshold and the second threshold, determining the variance for the pixel block directly based on the pixels of the pixel block.

6. The method of claim 1, wherein determining the variance comprises:
   determining that costs for a threshold number of blocks in a current frame in which the pixel block exists are above both a first threshold and second threshold; and
   responsive to determining that the costs for the threshold number of blocks are above the first threshold and the second threshold, directly determining the variance for all pixel blocks of the current frame based on pixel values of each respective pixel block.

7. The method of claim 1, wherein identifying the motion vector for the pixel block comprises:
   identifying a set of candidate motion vectors that point to pixel blocks of the reference frame within a search area;
   determining costs for the pixel blocks of the reference frame within the search area;
   identifying a cost of the determined costs; and
   identifying, as the motion vector for the pixel block, the candidate motion vector associated with the identified cost.

8. The method of claim 7, wherein determining the costs for each of the pixel blocks comprises:
   applying a mean absolute difference technique or a mean squared error technique on pixels of the pixel blocks.

9. The method of claim 1, wherein the reference frame comprises a frame prior to or after a current frame in which the pixel block exists.

10. A computer system for determining a variance for a pixel block, the computer system comprising:
    a processor; and
    a memory storing instructions for execution by the processor, the instructions causing the processor to:
        identify a motion vector for the pixel block, the motion vector being associated with a second pixel block of a reference frame;
        determine a cost for the pixel block, the cost indicating a degree of similarity between the pixel block and the second pixel block; and
        determine the variance for the pixel block based on the cost.

11. The computer system of claim 10, wherein determining the variance for the pixel block based on the cost comprises:
    determining that the cost is below a first threshold; and
    responsive to determining that the cost is below the first threshold, determining the variance for the pixel block as a variance of the second pixel block of the reference frame.

12. The computer system of claim 10, wherein determining the variance for the pixel block based on the cost comprises:
    determining that the cost is above a first threshold but below a second threshold; and
    responsive to determining that the cost is above the first threshold but below the second threshold, determining the variance for the pixel block as a variance of the second pixel block of the reference frame modified by a correlation factor.

13. The computer system of claim 12, wherein:
    the correlation factor is based on a correlation function that is based on video training data.

14. The computer system of claim 10, wherein determining the variance for the pixel block based on the cost comprises:
    determining that the cost is above a first threshold and a second threshold; and
    responsive to determining that the cost is above both the first threshold and the second threshold, determining the variance for the pixel block directly based on the pixels of the pixel block.

15. The computer system of claim 10, wherein determining the variance comprises:
    determining that costs for a threshold number of blocks in a current frame in which the pixel block exists are above both a first threshold and second threshold; and
    responsive to determining that the costs for the threshold number of blocks are above the first threshold and the second threshold, directly determining the variance for all pixel blocks of the current frame based on pixel values of each respective pixel block.

16. The computer system of claim 10, wherein identifying the motion vector for the pixel block comprises:
    identifying a set of candidate motion vectors that point to pixel blocks of the reference frame within a search area;
    determining costs for the pixel blocks of the reference frame within the search area;
    identifying a cost of the determined costs; and
    identifying, as the motion vector for the pixel block, the candidate motion vector associated with the identified cost.

17. The computer system of claim 16, wherein determining the costs for each of the pixel blocks comprises:
    applying a mean absolute difference technique or a mean squared error technique on pixels of the pixel blocks.

18. The computer system of claim 10, wherein the reference frame comprises a frame prior to or after a current frame in which the pixel block exists.

19. A non-transitory computer-readable medium storing instructions that, when executed by a processor, cause the processor to execute a method for determining a variance for a pixel block, the method comprising:
    identifying a motion vector for the pixel block, the motion vector being associated with a second pixel block of a reference frame;
    determining a cost for the pixel block, the cost indicating a degree of similarity between the pixel block and the second pixel block; and
    determining the variance for the pixel block based on the cost.

20. The non-transitory computer-readable medium of claim 19, wherein determining the variance for the pixel block based on the cost comprises:
    determining that the cost is below a first threshold; and
    responsive to determining that the cost is below the first threshold, determining the variance for the pixel block as a variance of the second pixel block of the reference frame.

21. The method of claim 1, further comprising one or more of:
    performing video stabilization based on the variance;
    performing video resizing or image resizing based on the variance; or
    performing lossy compression for video based on the variance.

22. The computer system of claim 10, wherein the instructions further cause the processor to perform one or more of:
    performing video stabilization based on the variance;
    performing video resizing or image resizing based on the variance; or
    performing lossy compression for video based on the variance.

23. The non-transitory computer-readable medium of claim 19, wherein the instructions further cause the processor to perform one or more of:
    performing video stabilization based on the variance;
    performing video resizing or image resizing based on the variance; or
    performing lossy compression for video based on the variance.

* * * * *